United States Patent [19]

Akagi

[11] Patent Number: 5,286,579
[45] Date of Patent: Feb. 15, 1994

[54] FUEL CELL

[75] Inventor: Kosuke Akagi, Ikoma, Japan

[73] Assignee: Osaka Gas Co., Ltd., Osaka, Japan

[21] Appl. No.: 737,673

[22] Filed: Jul. 30, 1991

[51] Int. Cl.$^5$ .............................................. H01M 8/10
[52] U.S. Cl. ........................................ 429/33; 429/38; 429/39
[58] Field of Search ................... 429/30, 33, 34, 38, 429/39, 40, 44

[56] References Cited

U.S. PATENT DOCUMENTS

| | | | |
|---|---|---|---|
| 4,342,816 | 8/1982 | Kothmann et al. | 429/38 X |
| 4,499,663 | 2/1985 | Zwick et al. | 429/32 X |
| 4,664,987 | 5/1987 | Jsenberg | 429/38 X |
| 5,023,152 | 6/1991 | Akagi | 429/32 |

Primary Examiner—Anthony Skapars
Attorney, Agent, or Firm—Gifford, Groh, Sprinkle, Patmore and Anderson

[57] ABSTRACT

A fuel cell includes a plurality of cells. Each cell has a three-layer plate member having an electrolyte layer, an oxygen electrode attached to one face of the electrolyte layer and a fuel electrode attached to the other face of the electrolyte layer. The cell also has a separator affixed only to the oxygen electrode and an oxygen-containing gas flow passage formed between the oxygen electrode and the separator. A plurality of fuel flow passages are formed between an adjacent pair of the cells as assembled. First and second partition wall members are respectively disposed tightly adjacent a pair of opposed end faces of the cell to which faces the oxygen-containing gas flow passage is closed by the separator. Third and fourth partition wall members are respectively disposed along a pair of opposed cell edge portions where the oxygen-containing gas flow passage is open between the pair of cells. The first and second partition wall members have end portions thereof projecting relative to the cell. The third and fourth partition wall members have end portions thereof projecting relative to the cell and placed in tight overlapping contact with the end portions of the first and second partition wall members.

20 Claims, 8 Drawing Sheets

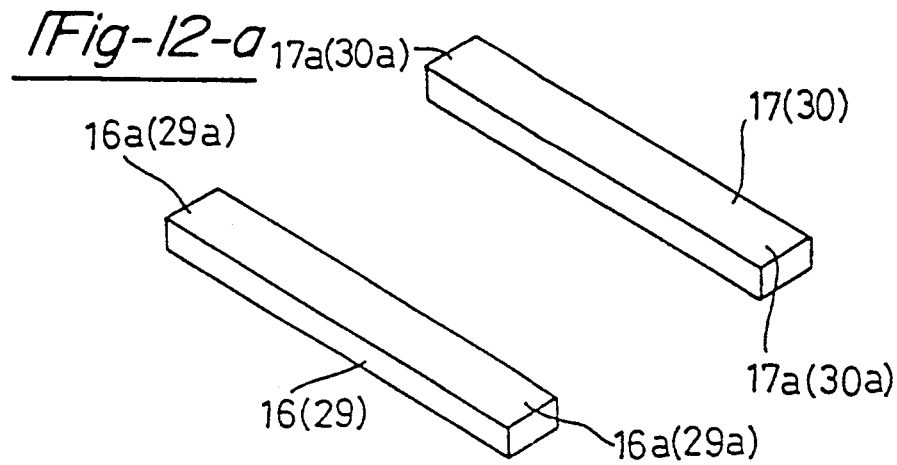
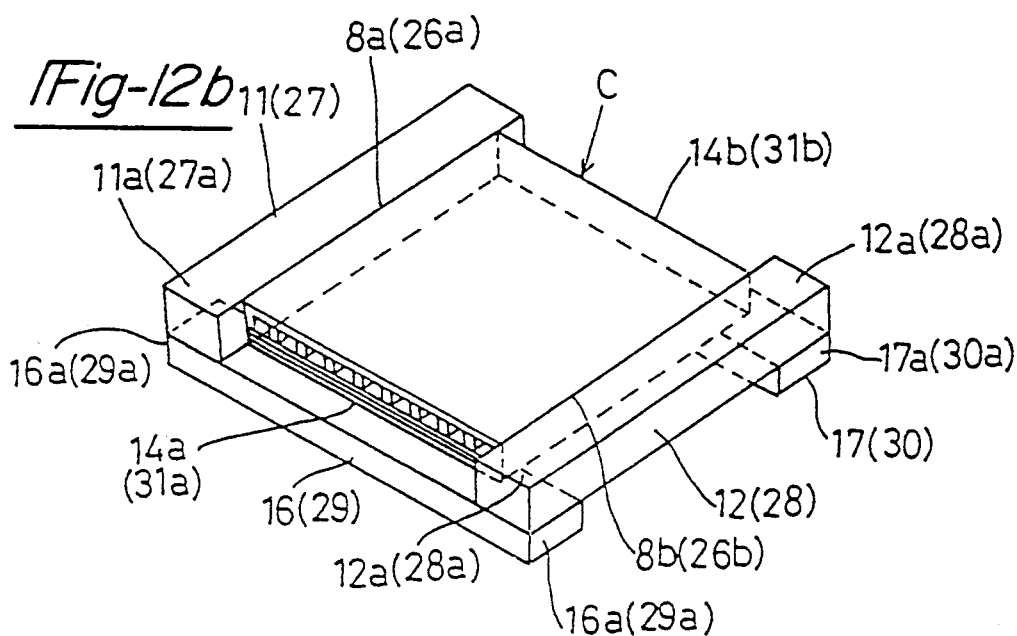
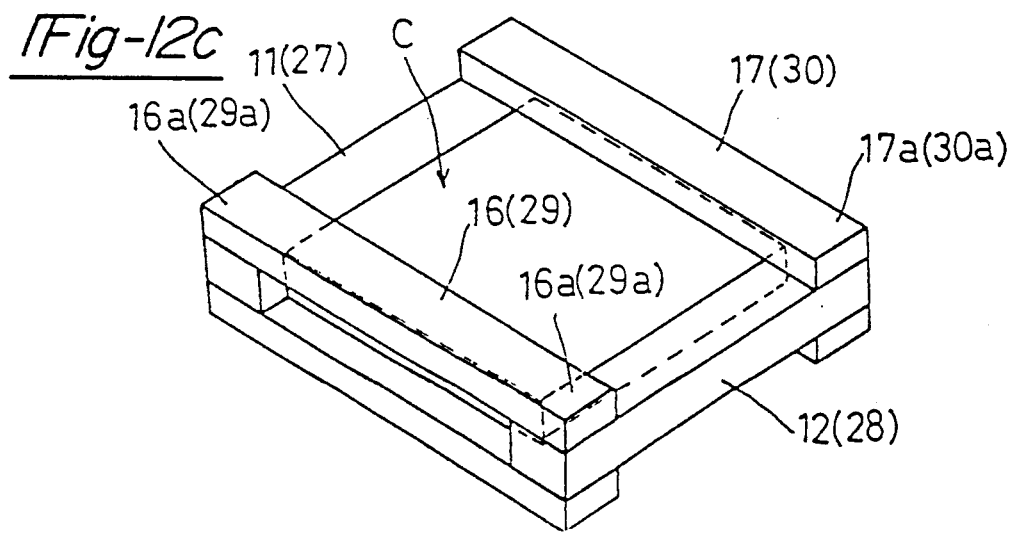

FUEL CELL

BACKGROUND OF THE INVENTION

1. Field of the Invention

The present invention relates to a fuel cell, and more particularly to a fuel cell comprising a plurality of cells, each cell including a three-layer plate member having a plate-like electrolyte layer, a film-like or plate-like oxygen electrode attached to one face of the electrolyte layer and a film-like or plate-like fuel electrode attached to the other face of the electrolyte layer, a separator affixed to either the oxygen electrode or the fuel electrode, and an oxygen-containing gas flow passage formed between the oxygen electrode and the separator or a fuel flow passage formed between the fuel electrode and the separator, so that a plurality of the fuel flow passages or of the oxygen-containg gas flow passages are formed between an adjacent pair of the cells.

2. Description of the Related Art

Conventionally, for arranging a plurality of cells, as illustrated in FIGS. 13 through 15, partition walls 48 are provided for partitioning between an air feed passage 42 and an air exhaust passage both communicated with a flow passage 41 formed between cells C and a further air feed passage 46 and a further air exhaust passage 47 communicated with a further flow passage 45 formed by a separator 44. Also, opposed ends 49a, 49b of the cell C to which the flow passage 45 formed by the separator 44 is open are respectively inserted into a plurality of holes defined in the partition wall 48.

However, the above described assembly requires a great amount of labor and costs for effecting the assembly steps of: preparing a pair of partition walls 48 each defining a plurality of insertion holes; respectively inserting the ends of the cell C into the insertion holes; and assuring air-tight condition between the ends 49a, 49b of the great number of cells C and the partition walls 48. In this respect, the prior art still has significant room for improvement.

The primary object of the present invention is to provide an improved fuel cell construction which allows easy and quick assembly of its electricity generating unit where an air-tight condition, that is complete separation must be provided between a fuel flow passage or an oxygen-containing gas flow passage and an air feed passage or an air exhaust passage communicated with the oxygen-containing gas flow passage or the fuel flow passage formed by the separator.

SUMMARY OF THE INVENTION

For accomplishing the above-noted object, a fuel cell according to the present invention, comprises:

a plurality of cells, each cell including;
  a three-layer plate member having an electrolyte layer, an oxygen electrode attached to one face of the electrolyte layer and a fuel electrode attached to the other face of the electrolyte layer,
  a separator affixed only to the oxygen electrode, and an oxygen-containing gas flow passage formed between the oxygen electrode and the separator;
a plurality of fuel flow passages each formed between an adjacent pair of said cells;
first and second partition wall members respectively disposed tightly adjacent a pair of opposed end faces of said cell to which faces said oxygen-containing gas flow passage is closed by said separator;

third and fourth partition wall members respectively disposed along a pair of opposed cell edge portions where said oxygen-containing gas flow passage is open between said adjacent pair of cells;
said first and second partition wall members having end portions thereof projecting relative to said cell; and
said third and fourth partition wall members having end portions thereof projecting relative to said cell and placed in tight overlapping contact with said end portions of said first and second partition wall members.

Functions and effects of the above-described construction will be described below.

The fuel cell having the above construction can be assembled by the following steps (A) through (D):

(A) First, as shown in FIG. 12(a), the third and fourth partition wall members 16, 17, or 29, 30 are placed in parallel with each other with an appropriate distance therebetween.

(B) Second, as shown in FIG. 12(b), a cell C is assembled with the above-arranged third and fourth partitions wall members 16, 17 (29, 30), with the cell edge portions 14a, 14b or 31a, 31b being placed in tight contact with the third and fourth partition wall members 16, 17 (28, 30) and also with the projecting ends 16a, 17a (29a, 30a) of the wall members 16, 17 (28, 30) being placed in tight contact with the projecting ends 11a, 12a (27a, 28a) of the first and second partition wall members 11, 12 (27, 28).

(C) Third, as shown in FIG. 12(c), the above-arranged assembly of the cell C and the first and second partition wall members 11, 12 (27, 28) is assembled with the third and fourth partition wall members 16, 17 (29, 30), with these third and fourth partition wall members being placed in tight contact with the cell edge portions 14a, 14b (31a, 31b) and also will the projecting ends 11a, 12a (27a, 28a) of the first and second partition wall members 11, 12 (27, 28) being placed in tight contact with the projecting ends 16a, 17a (29a, 30a) of the third and fourth partition wall members 16, 17 (29, 30).

(D) The above steps (B) and (C) are repeatedly carried out to arrange a plurality of cells C. In short, a desired number of cells C can be assembled simply by placing the first through fourth partition wall members 11, 12, 16, 17 (27, 28, 29, 30) in tight contact with each other in the predetermined order, so that the fuel flow passage 9 or the oxygen-containing gas flow passage 22 can be formed between an adjacent pair of cells C with the passage 9 or 22 being air-tightly separated from the oxygen-containing gas flow passage 5 or the fuel flow passage 24 formed by the separator 4 or 21 of the cell C. In this way, the fuel cell having the invention's construction can be readily and inexpensively assembled.

Further and other objects, features and effects of the invention will become more apparent from the following more detailed description of the embodiments of the invention with reference to the accompanying drawings.

BRIEF DESCRIPTION OF THE DRAWINGS

FIGS. 1 through 4 illustrate a first preferred embodiment of the present invention; in which, FIG. 1 is a section view, FIG. 2 is a perspective view taken along a line 2—2 of FIG. 1, FIG. 3 is a perspective view taken along a line 3—3 of FIG. 1, and FIG. 4 is an exploded perspective view of a cell;

FIGS. 5 through 8 illustrate a second preferred embodiment of the present invention; in which, FIG. 5 is a section view, FIG. 6 is a perspective view taken along a line 6—6 of FIG. 5, FIG. 7 is a perspective view taken along a line 7—7 of FIG. 5, and FIG. 8 is an exploded perspective view of a cell of this embodiment;

FIGS. 9 through 11 illustrate a third preferred embodiment of the present invention; in which, FIG. 9 is a section view, FIG. 10 is a perspective view taken along a line 10—10 of FIG. 9, and FIG. 11 is a perspective view taken along a line 11—11 of FIG. 9, FIGS. 12(a) through 12(c) are perspective views illustrating an assembly procedure of the invention's fuel cell construction, FIGS. 13 through 15 show the prior art; in which, FIG. 13 is a section view, FIG. 14 is a perspective view taken along a line 14—14 of FIG. 13, and FIG. 15 is a perspective view taken along a line 15—15 of FIG. 13, respectively.

DESCRIPTION OF THE PREFERRED EMBODIMENTS

Figure 1:
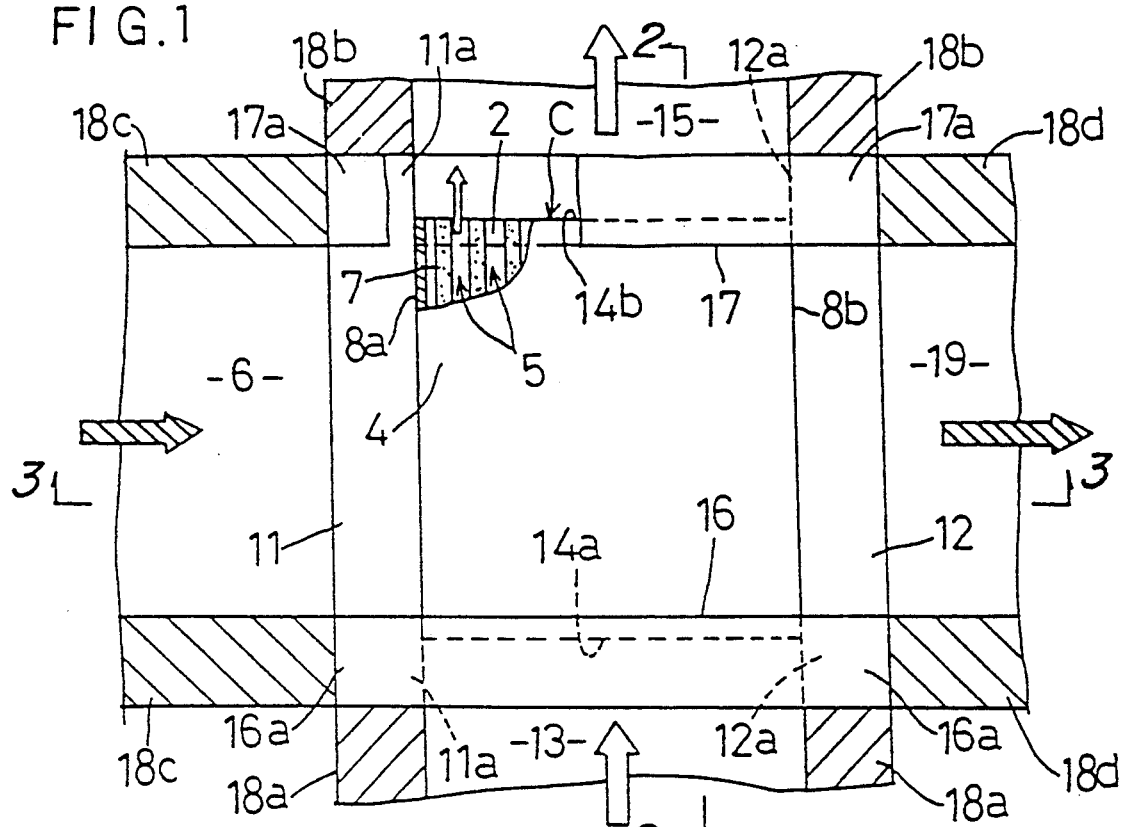
Figure 2:
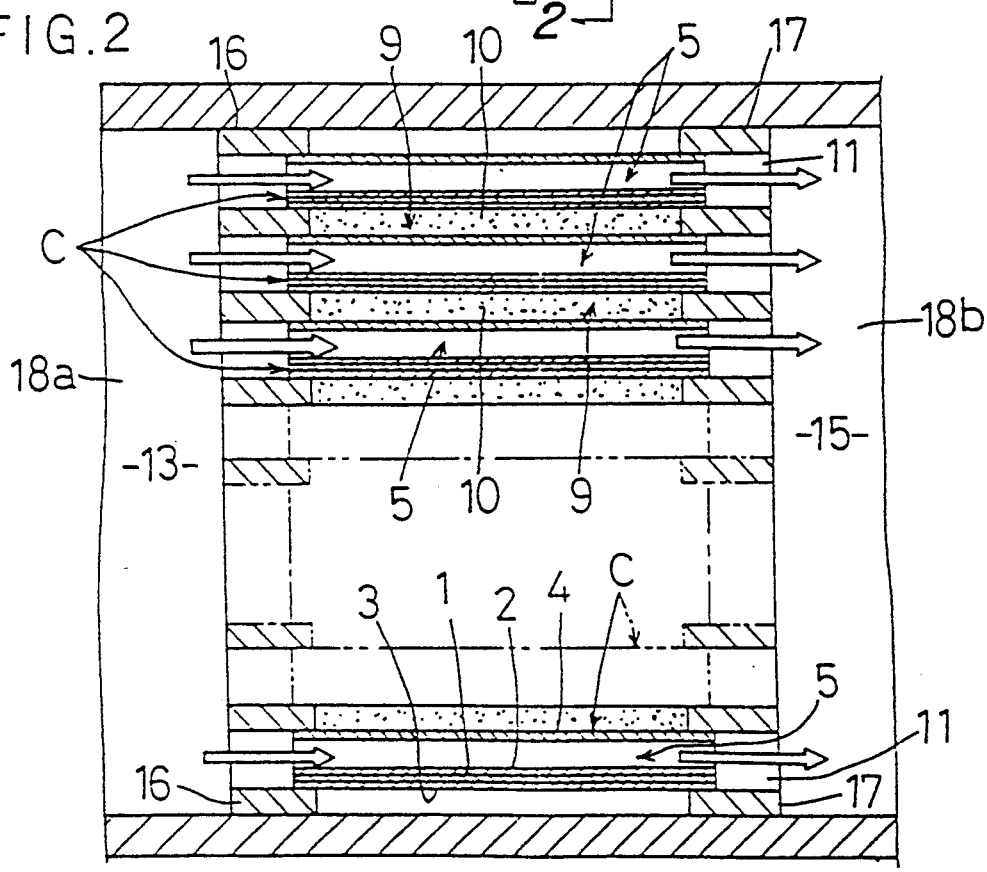
Figure 3:
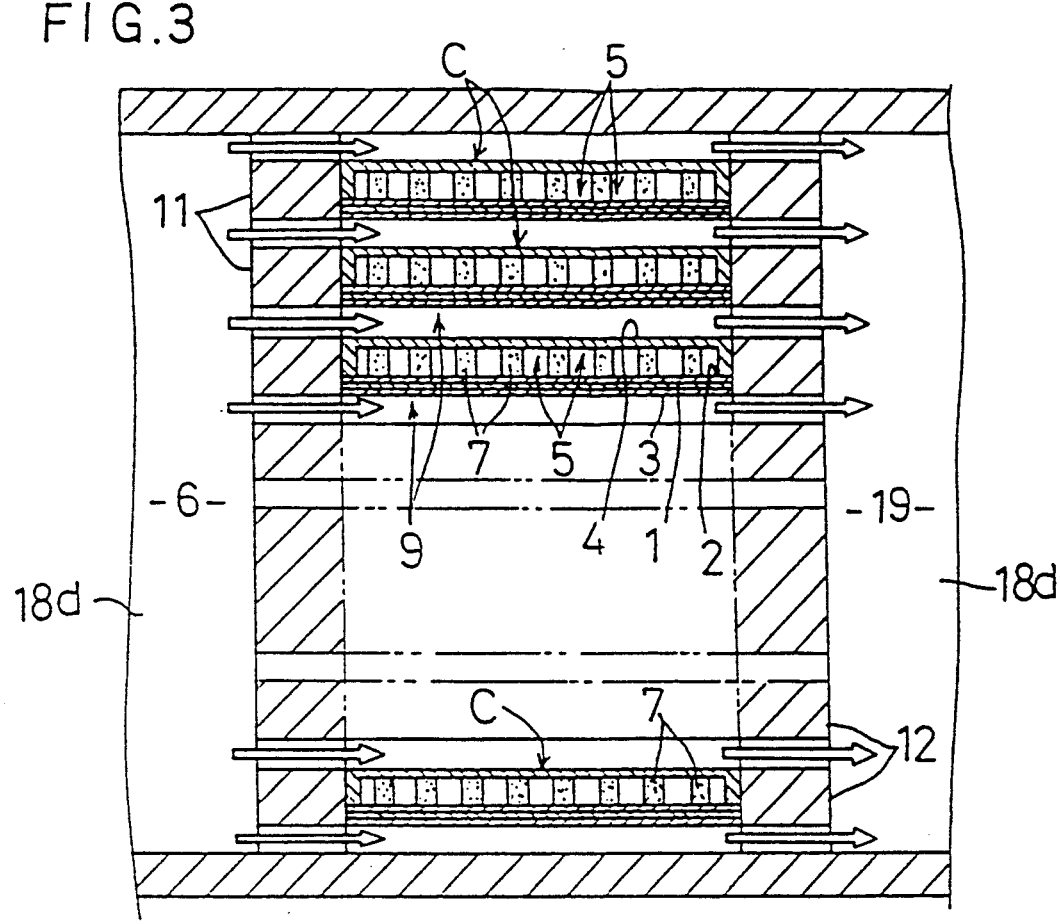
Figure 4:
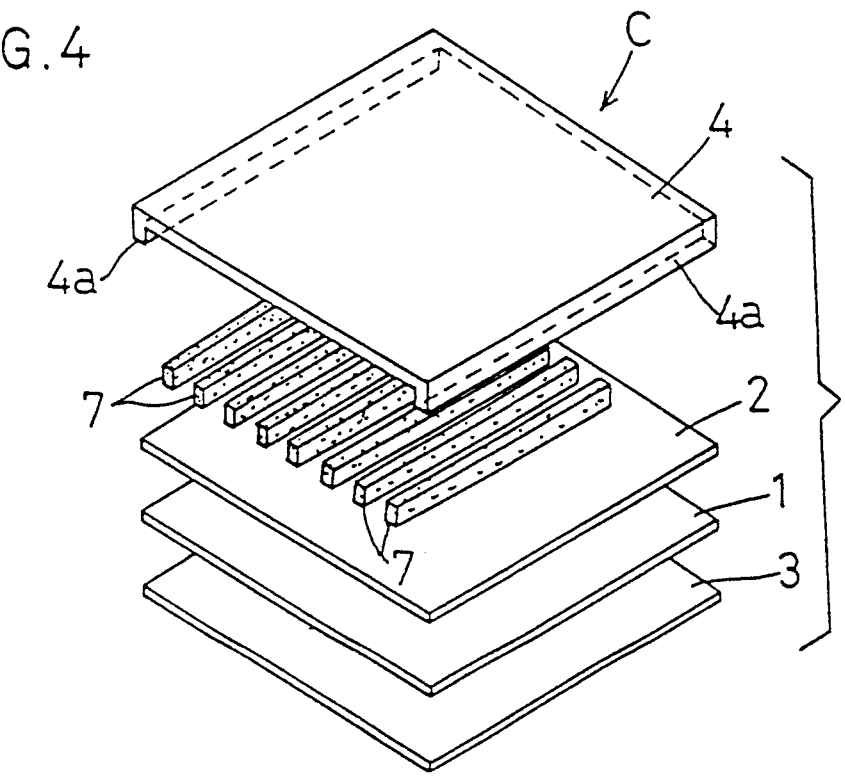
Figure 5:
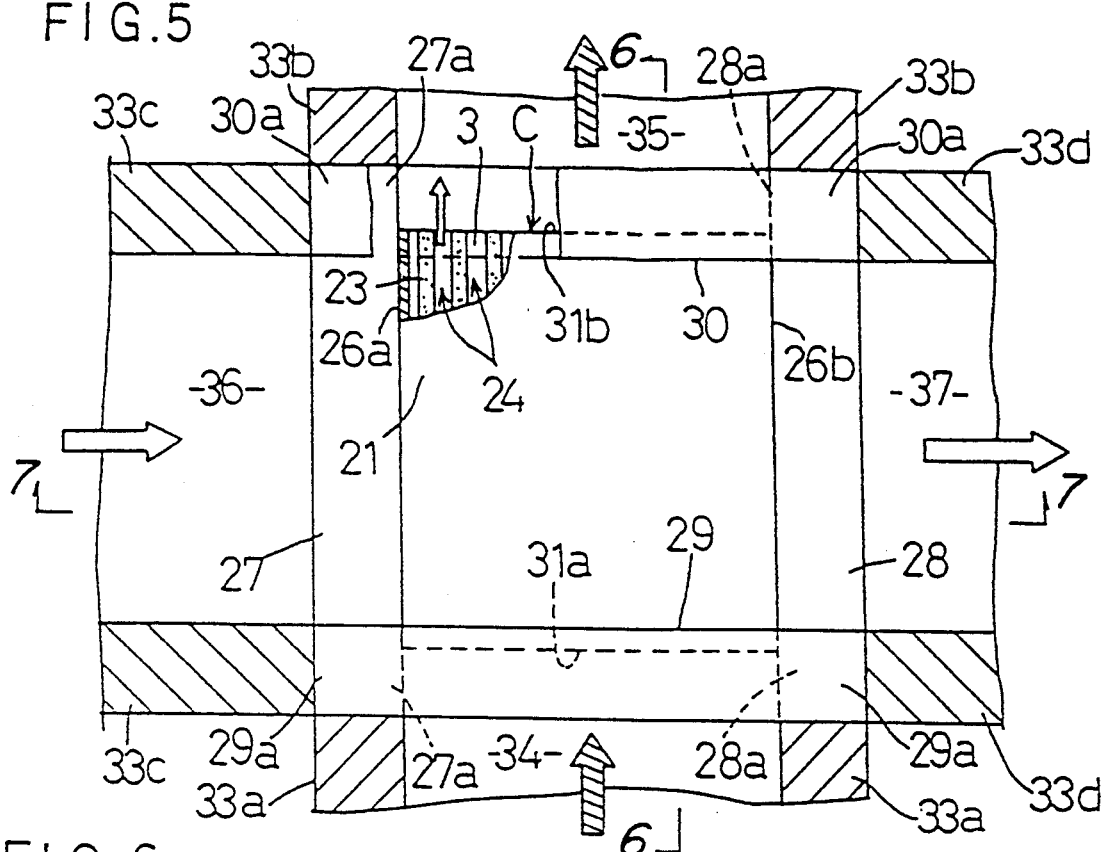
Figure 6:
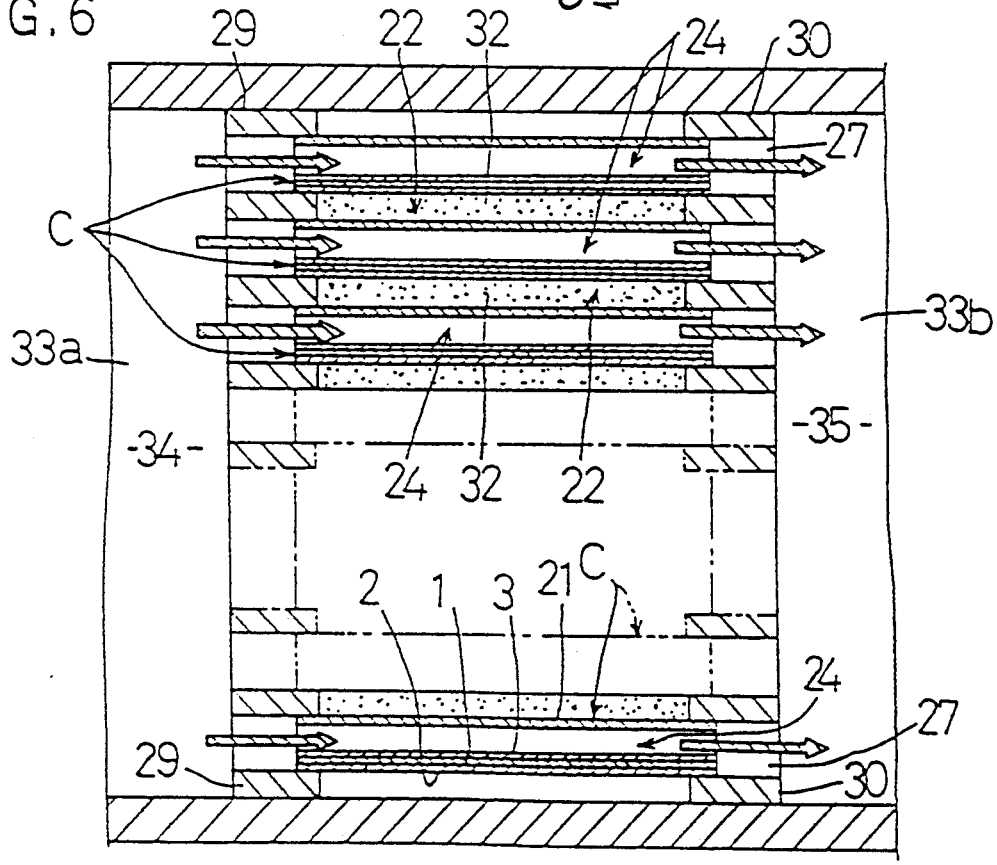
Figure 7:
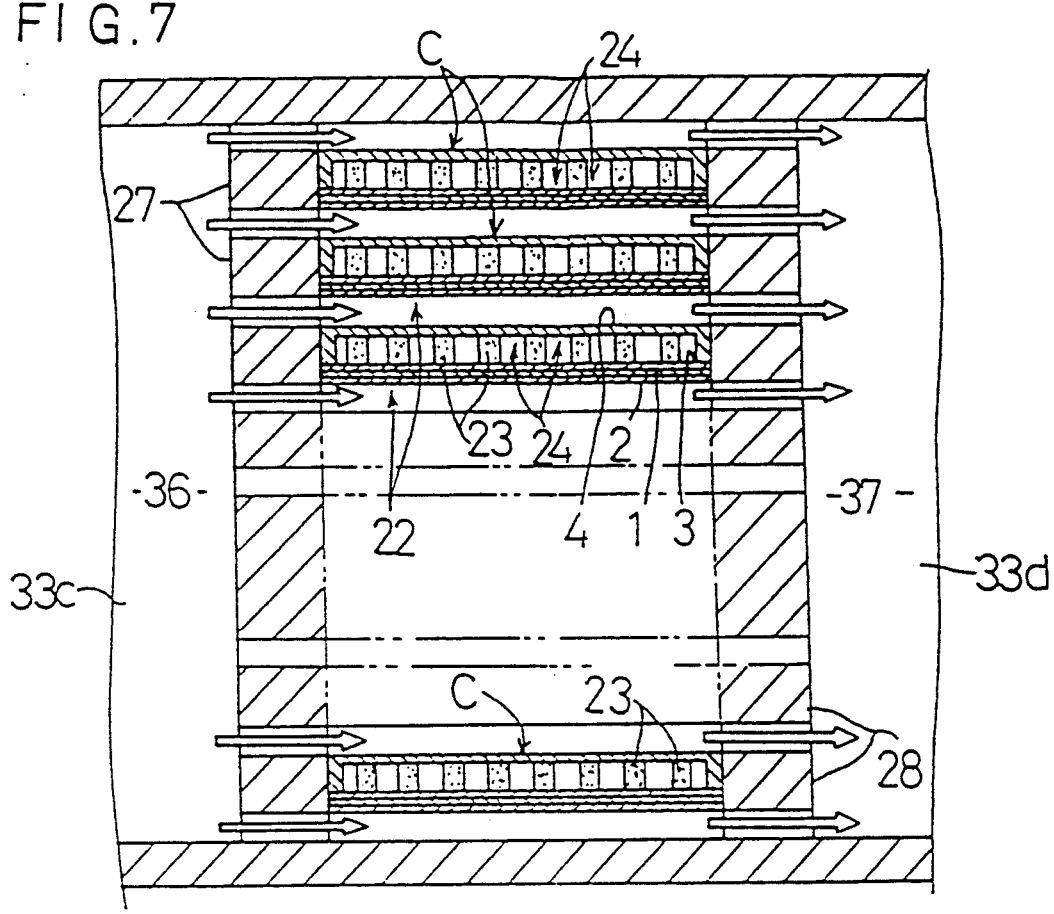
Figure 8:
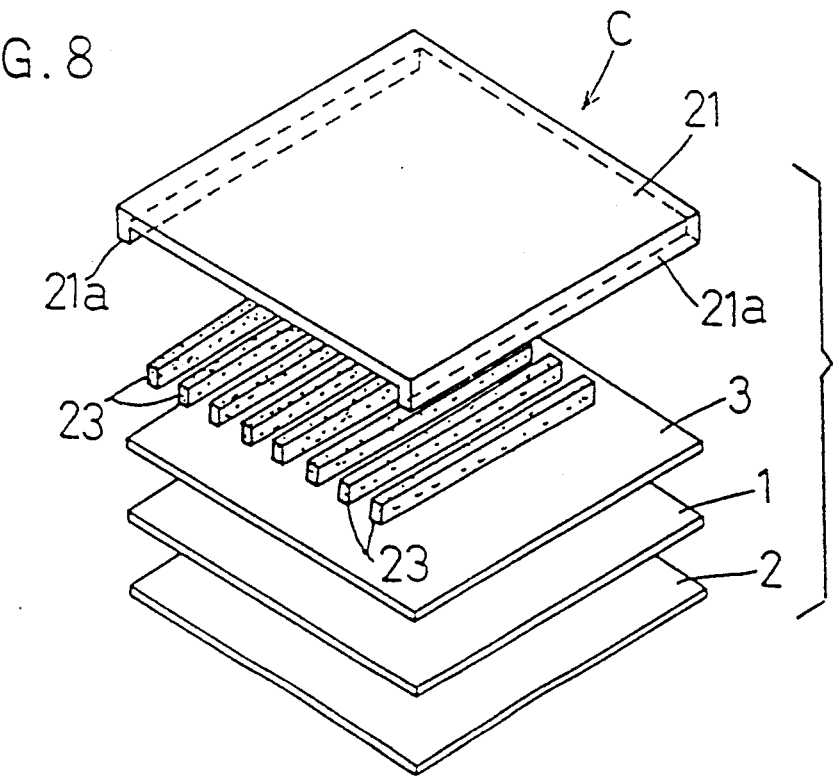

Preferred embodiments of a fuel cell relating to the present invention will now be described in details with reference to the accompanying drawings.

FIGS. 1 through 4 illustrate a first preferred embodiment of the present invention.

A film or plate-like oxygen electrode 2 is integrally affixed to substantially an entire face of a rectangular, plate-like electrolyte layer 1; while, a film or plate-like fuel electrode 3 is integrally affixed to substantially the entire other face of the layer 1. Thus, these elements 1, 2 and 3 together constitute a three-layer rectangular plate member for obtaining electricity through the oxygen electrode 2 and the fuel electrode 3.

The electrolyte layer 1 is formed of any appropriate material including $ZrO_2$ solved with $Y_2O_3$ in the order of 3 through 8 mol. %. The oxygen electrode 2 is formed of any appropriate material such as $LaMnO_3$. The fuel electrode 3 is formed of any appropriate material such as cermet of Ni and $ZrO_2$.

Further, a conductive separator 4 having a pair of line projections 4a is attached only to the oxygen electrode 2, with the entire line projections 4a being affixed to the oxygen electrode 2. With these, a fuel cell C is formed with an oxygen-containing gas flow passage 5 being formed as a gap between the oxygen electrode 2 and the separator 4.

The separator 4 is formed of any appropriate material such as $LaCrO_3$ having good resistance against corrosion due to oxidation and reduction.

At the oxygen-containing gas flow passage 5, conductive members 7 are disposed substantially equidistantly and in parallel with each other and also in tight contact with the oxygen electrode 2 and the separator 4. Accordingly, the construction provides a large section area of electricity conducting passage extending from the oxygen electrode 2 to the separator 4 acting as a cell terminal.

The conductive member 7 is comprised of any appropriate material, in the form of a grooved flat plate or felt-like member, such as $LaMnO_3$ having good resistance against heat and oxidation.

Then, a plurality of the above-described cells C are arranged with each other, with a fuel flow passage 9 being formed between an adjacent pair of the cells C and with this fuel flow passage being separated from the oxygen-containing gas flow passage 5. More particularly, at each rectangular cell C, first and second partition wall members 11, 12 each having a thickness substantially equal to that of the cell C are respectively placed in tight contact with a pair of opposed end faces 8a, 8b of the cell C to which end faces the oxygen-containing gas flow passage 5 is closed by the line projections 4a of the separator 4. Further, opposed ends 11a, 12a of these first and second partition wall members 11, 12 project relative to the cell C. On the other hand, between an adjacent pair of cells C, third and fourth partition wall members 16, 17 having substantially same thickness relative to each other are placed in tight contact with an opposed pair of cell edge portions 14a, 14b at which the oxygen-containing gas flow passage 5 is open; and opposed ends 16a, 17a of these third and fourth partition wall members 16, 17 project relative to the cell C and are overlapped with the above-described opposed ends 11a, 12a of the first and second partition wall members 11, 12. Further, between the adjacent pair of cells C, there is interposed an elastic and conductive, connecting member 10, so that all the fuel electrodes 3 of the cells C face the fuel flow passage 9 and all the cells C are serially connected with each other through the connecting members 10.

The first through fourth partition wall members 11, 12, 16 and 17 are formed of a ceramic material such as $ZrO_2$ solved with Ca or $Y_2O_3$.

The connecting member 10 is formed of any appropriate material such as a felt-like material of Ni having good resistance against heat and good conductivity.

To each inlet opening of the oxygen-containing gas flow passage 5 inside the cell C, an oxygen-containing gas feed passage 13 formed by a partition wall 18a is communicated; and to each outlet opening of the passage 5, an air exhaust passage 15 formed by a further partition wall 18b is communicated. Further, to each inlet opening of the fuel flow passage 9 formed between the cells C, a fuel feed passage 6 formed by a partition wall 18c is communicated; and to each outlet opening of the passage 9, an air exhaust passage 19 formed by a partition wall 18d is communicated.

The connecting portions tightly connecting between the first through fourth partition wall members 11, 12, 16 and 17 and the cells C are rendered air-tight, if necessary, by means of an electrically non-conductive adhesive agent such as of ceramic fusion material having good resistance against heat and good insulating property.

In operation of the above-described construction, the oxygen-containing gas flow passage 5 is supplied with such oxygen-containing gas as air, oxygen-rich air and oxygen. Whereas, the fuel flow passage 9 is supplied with any of various kinds of fuel as $H_2$ supply. Then, at each cell C, there is generated electricity due to the function of its electrolyte layer 1, and the electricity generated at each cell C is collected through the serial connection of the cells C.

Then, as described hereinbefore with reference to FIGS. 12(a) through 12(c), this power-generating unit of the fuel cell of this embodiment can be easily and inexpensively manufactured and assembled simply by arranging the first through fourth partition wall members 11, 12, 16 and 17 and the cells C in the predetermined order.

A second preferred embodiment of the present invention will now be described with reference to FIGS. 5 through 8.

Like the first embodiment, in the cell construction of this second embodiment too, a separator 21 and a conductive member 23 are attached only to the side of the fuel electrode of the three-layer plate member used also in the first embodiment. And, a fuel flow passage 24 is formed between the fuel electrode 3 and the separator 21.

Then, a plurality of the above-described cells C are arranged with each other, with an oxygen-containing gas flow passage 22 being formed between an adjacent pair of the cells C and with this oxygen-containing gas flow passage 22 being separated from the fuel flow passage 24. More particularly, at each rectangular cell C, first and second partition wall members 27, 28 each having a thickness substantially equal to that of the cell C are respectively placed in tight contact with a pair of opposed end faces 26a, 26b of the cell C to which end faces the fuel flow passage 24 is closed by line projections 21a of the separator 21. Further, opposed ends 27a, 28a of these first and second partition wall members 27, 28 project relative to the cell C. On the other hand, between an adjacent pair of cells C, third and fourth partition wall members 29, 30 having substantially same thickness relative to each other are placed in tight contact with an opposed pair of cell edge portions 31a, 31b at which the fuel flow passage 24 is open; and opposed ends 29a, 30a of these third and fourth partition wall members 29, 30 project relative to the cell C and are overlapped with the above-described opposed ends 27a, 28a of the first and second partition wall members 27, 28. Further, between the adjacent pair of cells C, there is interposed an elastic and conductive, connecting member 32. This connecting member 32, although substantially corresponding to the connecting member 10 used in the first embodiment, differs from the member 10 in that the connecting member 32 is formed mainly of La Mn $O_3$ which material is effective in oxidizing atmosphere.

To each inlet opening of the fuel flow passage 24 inside the cell C, a fuel feed passage 34 formed by a partition wall 33a is communicated; and to each outlet opening of the passage 24, an air exhaust passage 35 formed by a further partition wall 33b is communicated. Further, to each inlet opening of the oxygen-containing gas flow passage 22 formed between the cells C, an oxygen-containing gas feed passage 36 formed by a partition wall 33c is communicated; and to each outlet opening of the passage 22, an air exhaust passage 37 formed by a partition wall 33d is communicated.

The connecting portions tightly connecting between the first through fourth partition wall members 27, 28, 29 and 30 and the cell C are rendered air-tight, if necessary, by means of an adhesive agent, as is the case with the first embodiment.

In short, this second embodiment too can provide a fuel cell which electricity generating unit is as powerful as and which can be manufactured and assembled as easily as that of the first embodiment.

Figure 9:
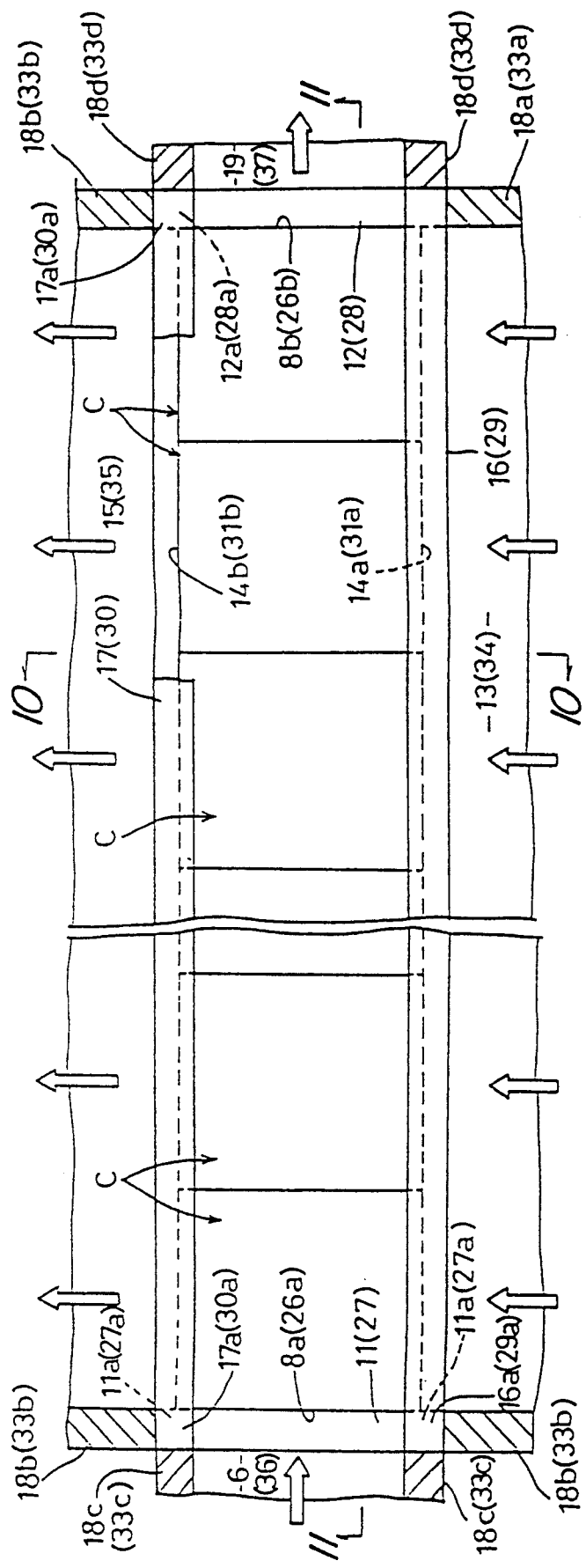
Figure 10:
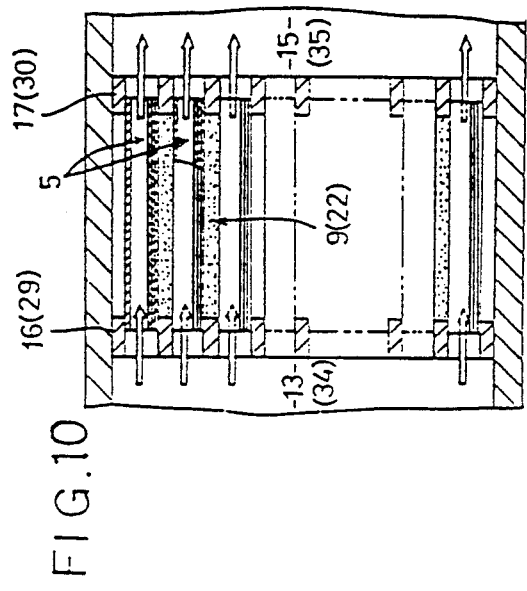
Figure 11:
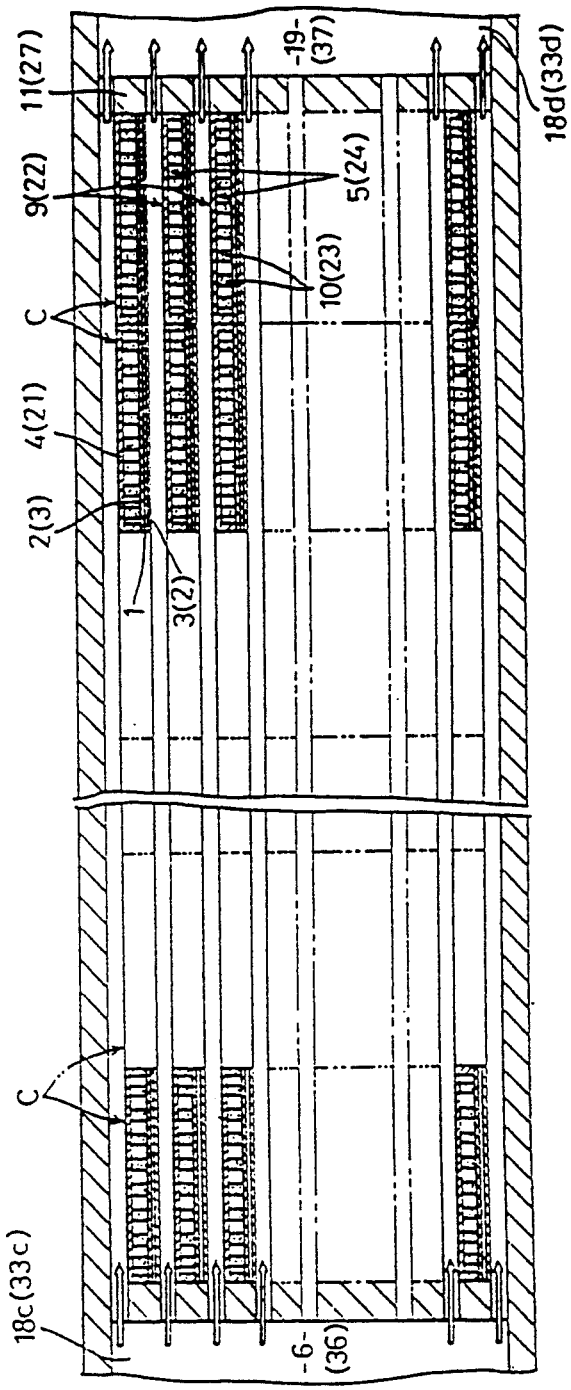
Figure 13:
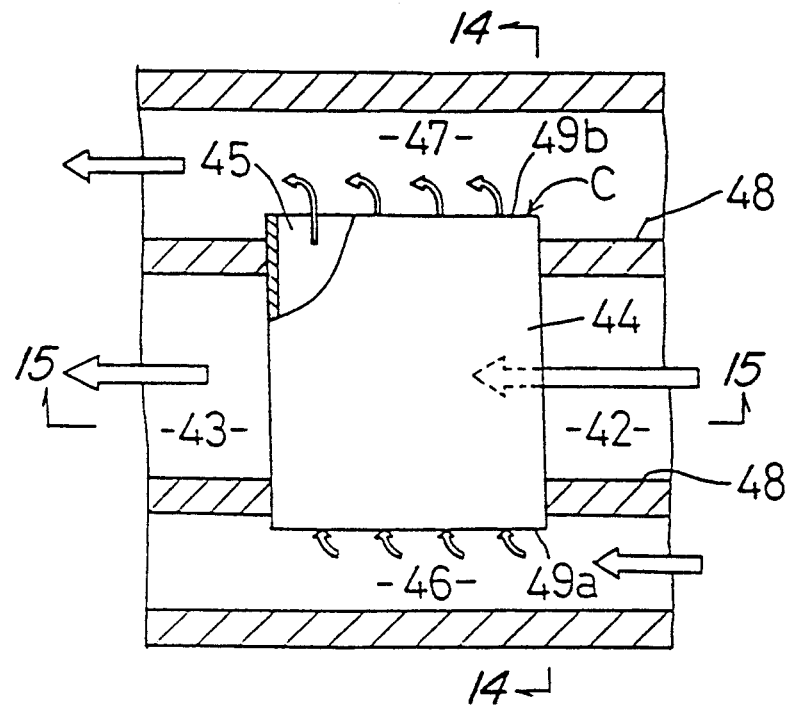
Figure 14:
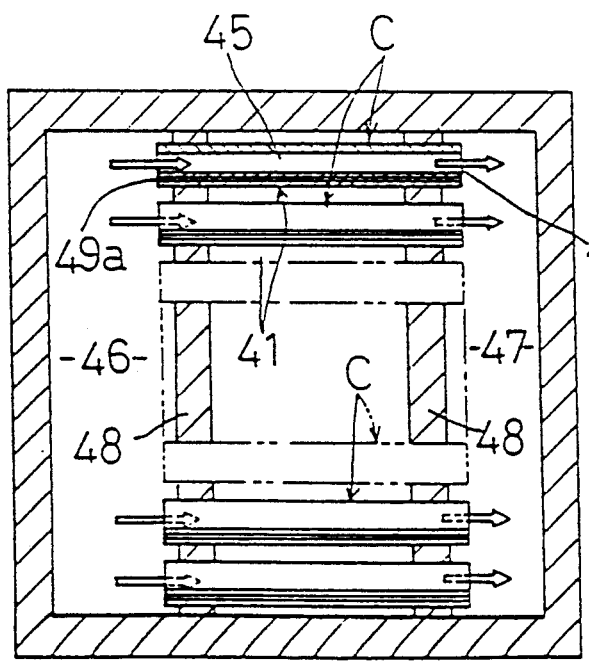
Figure 15:
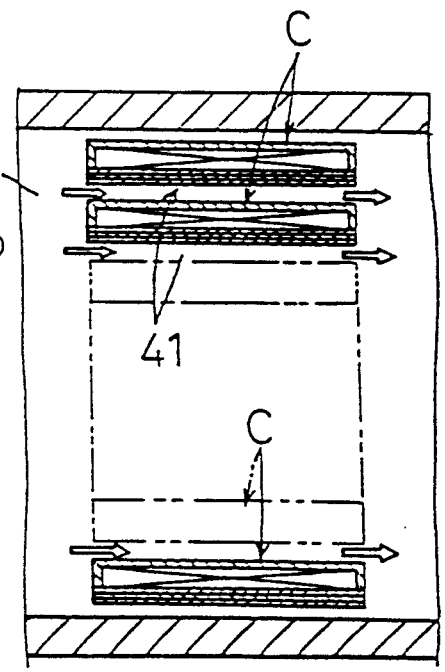

A third preferred embodiment of the present invention will now be described with reference to FIGS. 9 through 11.

In the cell construction of this third embodiment, each of the third and fourth partition wall members 16, 17 or 29, 30 has a longitudinal dimension enough to cope with a group of cells C arranged on a same plane. Then, in the same manner described in connection with the first and second embodiments, a plurality of cells C are arranged with the first through fourth partition wall members 11, 12, 16, 17 (28, 29, 30, 31), with the fuel flow passages 9 or the oxygen-containing gas flow passages 22 being formed between adjacent pairs of the cells C. Thus, the fuel cell construction of this third embodiment too can achieve the same distinguished effects as achieved by the first and second embodiment constructions.

Some other alternate embodiments of the present invention will be specifically described next.

The number of the conductive members 7, 23 used in the oxygen-containing gas flow passages 5 formed between the oxygen electrodes 2 and the separators 4 and in the fuel flow passages 24 formed between the fuel electrodes 3 and the separators 21 can vary conveniently. Further, these conductive members 7, 23 can be eliminated at all.

The line projections 4a, 21a of the separators 4, 21 can be affixed to the plate-like electrolyte layer 1 as well. Further, in these separators 4, 21, the flat plate-like main portions and the line projections 4a, 21a can be affixed independently of each other.

The connecting members 10, 32 interposed between the cells C can be eliminated at all.

The flow passage construction for feeding and exhausting the oxygen-containing gas and the fuel can vary depending on the convenience.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A fuel cell comprising.
   a plurality of cells, each cell including;
   a three-layer plate member having an electrolyte layer, an oxygen electrode attached to one face of the electrolyte layer and a fuel electrode attached to the other face of the electrolyte layer,
   a separator affixed only to the oxygen electrode, and
   an oxygen-containing gas flow passage formed between the oxygen electrode and the separator;
   a plurality of fuel flow passages each formed between an adjacent pair of said cells;
   first and second partition wall members respectively disposed tightly adjacent a pair of opposed end faces of said cell to which faces said oxygen-containing gas flow passage is closed by said separator;
   third and fourth partition wall members respectively disposed along a pair of opposed cell edge portions where said oxygen-containing gas flow passage is open between said adjacent pair of cells;

said first and second partition wall members having end portions thereof projecting relative to said cell; and said third and fourth partition wall members having end portions thereof projecting relative to said cell and placed in tight overlapping contact with said end portions of said first and second partition wall members.

2. A fuel cell as defined in claim 1, wherein said electrolyte layer comprises a plate-like member while said oxygen electrode and said fuel electrode each comprises a film or plate-like construction.

3. A fuel cell as defined in claim 2, wherein said first and second partition wall members each has a thickness substantially equal to that of said cell, while said third and fourth partition wall members have substantially same thickness relative to each other.

4. A fuel cell as defined in claim 3, wherein said cells are connected with each other through a connecting member having good heat resistance and conductivity.

5. A fuel cell as defined in claim 4, wherein said connecting member comprises a felt-like member formed of Ni.

6. A fuel cell as defined in claim 3, wherein said first through fourth partition wall members are formed of a ceramic material including $ZrO_2$ solved with Ca or $Y_2O_3$.

7. A fuel cell as defined in claim 3, wherein said electrolyte layer is formed of a material including $ZrO_2$ solved with $Y_2O_3$.

8. A fuel cell as defined in claim 3, wherein said oxygen electrode is formed mainly of $LaMnO_3$.

9. A fuel cell as defined in claim 3, wherein said fuel electrode is formed or cermet of Ni and $ZrO_2$.

10. A fuel cell as defined in claim 3, wherein each of said third and fourth partition wall members has a longitudinal dimension enough to cope with a group of said cells arranged on a same plane.

11. A fuel cell comprising:
a plurality of cells, each cell including;
a three-layer plate member having an electrolyte layer, an oxygen electrode attached to one face of the electrolyte layer and a fuel electrode attached to the other face of the electrolyte layer,
a separator affixed only to the fuel electrode, and
a fuel flow passage formed between the fuel electrode and the separator;
a plurality of oxygen-containing gas flow passages each formed between an adjacent pair of said cells;
first and second partition wall members respectively disposed tightly adjacent a pair of opposed end faces of said cell to which faces said fuel flow passage is closed by said separator;
third and fourth partition wall members respectively disposed along a pair of opposed cell edge portions where said fuel flow passage is open between said adjacent pair of cells;
said first and second partition wall members having end portions thereof projecting relative to said cell; and
said third and fourth partition wall members having end portions thereof projecting relative to said cell and placed in tight overlapping contact with said end portions of said first and second partition wall members.

12. A fuel cell as defined in claim 11, wherein said electrolyte layer comprises a plate-like member while said oxygen electrode and said fuel electrode each comprises a film or plate-like construction.

13. A fuel cell as defined in claim 12, wherein said first and second partition wall members each has a thickness substantially equal to that of said cell, while said third and fourth partition wall members have substantially same thickness relative to each other.

14. A fuel cell as defined in claim 13, wherein said cell are connected with each other through a connecting member having good heat resistance and conductivity.

15. A fuel cell as defined in claim 14, wherein said connecting member is formed mainly of $LaMnO_3$.

16. A fuel cell as defined in claim 13, wherein said first through fourth partition wall members are formed of a ceramic material including $ZrO_2$ solved with Ca or $Y_2O_3$.

17. A fuel cell as defined in claim 13, wherein said electrolyte layer is formed of a material including $ZrO_2$ fused with $Y_2O_3$.

18. A fuel cell as defined in claim 13, wherein said oxygen electrode is formed mainly of $LaMnO_3$.

19. A fuel cell as defined in claim 13, wherein said fuel electrode is formed of cermet of Ni and $ZrO_2$ 20. A fuel cell as defined in claim 13, wherein each of said third and fourth partition wall members has a longitudinal dimension enough to cope with a group of said cells arranged on a same plane.

* * * * *